United States Patent [19]

Hayakawa et al.

[11] 4,311,179
[45] Jan. 19, 1982

[54] MOTOCROSS TIRE FOR MOTORCYCLES

[75] Inventors: Toshio Hayakawa, Higashimurayama; Shoji Yoshida, Higashikurume, both of Japan

[73] Assignee: Bridgestone Tire Company Limited, Tokyo, Japan

[21] Appl. No.: 92,309

[22] Filed: Nov. 8, 1979

[30] Foreign Application Priority Data

Nov. 27, 1978 [JP] Japan .................................. 53-145252
Nov. 27, 1978 [JP] Japan .................................. 53-145253

[51] Int. Cl.³ ............................................ B60C 11/06
[52] U.S. Cl. ................................ 152/209 R; D12/140
[58] Field of Search ....................... 152/209 D, 209 R; D12/136, 139, 140, 138

[56] References Cited

U.S. PATENT DOCUMENTS

D. 254,367  3/1980  Kamiya ................................ D12/136
D. 254,665  4/1980  Sato et al. ............................ D12/136
3,730,245   5/1973  Kusunoki et al. ............... 152/209 R
3,842,879  10/1974  Mills et al. ....................... 152/209 R
3,951,191   4/1976  Suzuki et al. ..................... 152/209 R Primary Examiner—Michael W. Ball
Attorney, Agent, or Firm—Sughrue, Mion, Zinn, Macpeak & Seas

[57] ABSTRACT

A motocross tire for motorcycles comprising a tread pattern including blocks divided into a plurality of block groups. The block groups has adjacent blocks whose centers are circumferentially displaced by 3 to 25 mm. All of the blocks are arranged such that a ratio of a ground contact area of the blocks to an apparent ground contact area of the tire changes within a range of ±0.05 in response to a change of the camber angle of the tire.

9 Claims, 11 Drawing Figures

FIG.7a     FIG.7b     FIG.7c
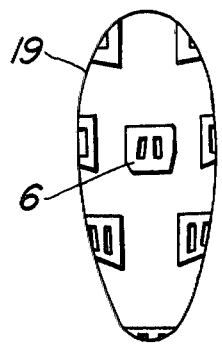 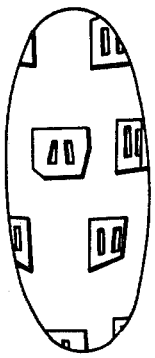 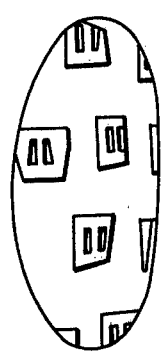
Camber Angle: 0°    Camber Angle: 10°    Camber Angle: 20°
FIG.7d     FIG.7e
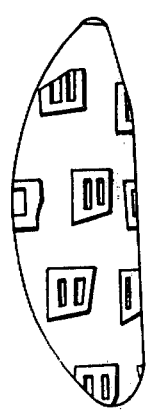 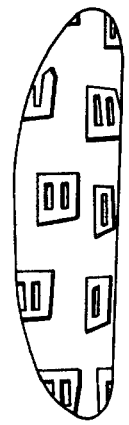
Camber Angle: 30°    Camber Angle: 40°

MOTOCROSS TIRE FOR MOTORCYCLES

BACKGROUND OF THE INVENTION

1. Field of the Invention

This invention relates to an improvement in a motocross tire for motorcycles.

2. Description of the Prior Art

In the specification, the term motocross shall be understood to mean motorcycle races in which drivers compete with each other to see who can turn round a given course on highly undulating irregular ground as many times as possible within a predetermined time or to see who can run a given number of rounds within a minimum time.

A motocross tire used for such motorcycle races is different from a conventional motorcycle tire used on a paved road. That is, the motocross tire is provided at its tread with a block pattern comprising polygonal rubber blocks suited for grasping the ground and projected from the tread surface in a regular manner for the purpose of travelling on mud or gravel.

In the motocross tire, the tread has heretofore been designed by taking the following two points into consideration.

In the first place, care is taken to a ratio of a space portion formed between adjacent blocks and grasping mud or gravel when the tire runs to a block portion. In general, it is preferable to make the above mentioned space portion for the overall tread small for the purpose of alleviating wear of the block. In this case, however, the important ground grasping property of the tire becomes degraded and hence the desired object could not be attained.

On the contrary, if the space portion is increased, the ground grasping property tends to increase upto a given limit. But, the blocks as a whole decrease in volume inducing premature wear of the tire. As a result, a bad influence is exerted upon the ground grasping property at the latter part of the motocross race.

Secondly, the motocross tire becomes rapidly worn when compared with the wear of the usual tire. It has heretofore been proposed to make rubber of the block considerably hard for the purpose of preventing degradation of the running ability of the motocross tire due to its wear when used. The use of such a measure, however, involves breakage of the block and degradation of the ground grasping ability of the tire.

It has also been proposed to provide a tread pattern comprising a group of blocks composed of a plurality of blocks having a square or rectangular outer surface and arranged side by side in parallel with the rotary axis of the tire and circumferentially spaced apart from each other by a regular distance.

The inventors' investigations and research have demonstrated the result that in the motocross tire mounted on a driving wheel (usually a rear wheel) which is important for the motocross race, a ratio of the driving force to a braking force, both being subjected to the tire when it runs, is about 70 to 30, that is, the driving force is far larger than the braking force. Also, the side surface of the ground contact surface subjected to the driving force when the tire runs, that is, that side surface of the block which precedes in the direction of rotation of the tire is often subjected to the driving force with the above mentioned ratio if compared with that side surface of the block which is opposed to the above mentioned side surface of the block and subjected to the braking force. If the motorcyle body is inclined to ground so as to turn its direction, that is, if the equatorial plane of the tire is inclined at an angle to a plane perpendicular to the horizontal surface (this inclined angle is called as a camber angle which sometimes becomes a large angle of about 40°), centrifugal force is subjected to the motorcycle body in the horizontal direction and a camber thrust is produced between the ground surface and the tire in a direction opposed to the centrifugal force. Among the blocks of the tread, that side surface of the block which is mainly subjected to the camber thrust is located at that side surface of the block which lies in the specified region.

SUMMARY OF THE INVENTION

An object of the invention, therefore, is to provide a motocross tire for motorcycles which can effectively maintain its ground grasping property irrespective of the progress of a wear of the block.

A feature of the invention is the provision in a motocross tire for motorcyles comprising a pair of bead portions, a toroidal carcass extending across said bead portions, and a tread including a number of blocks having an outer surface extending from the crown portion of said carcass along the contour of said carcass to both sides thereof and spaced apart from each other by a transverse groove and a longitudinal groove, improvement in which said blocks are divided into a plurality of block groups extending in the widthwise direction of the tire and including a block group having adjacent blocks whose centers are circumferentially displaced by 3 to 25 mm and all of the blocks are arranged such that a ratio of the net ground contact area of the blocks to the gross ground contact area of the tire changes within a range of ±0.05 in response to a change of the camber angle of the tire.

Further objects and features of the invention will be fully understood from the following detailed description with reference to the accompanying drawings, wherein:

BRIEF DESCRIPTION OF THE DRAWINGS

FIGS. 7a to 7e are diagrammatic views of foot prints showing change of the ground contact configuration in response to an increase of the camber angle of the tire.

DETAILED DESCRIPTION OF THE PREFERRED EMBODIMENTS

Figure 1:
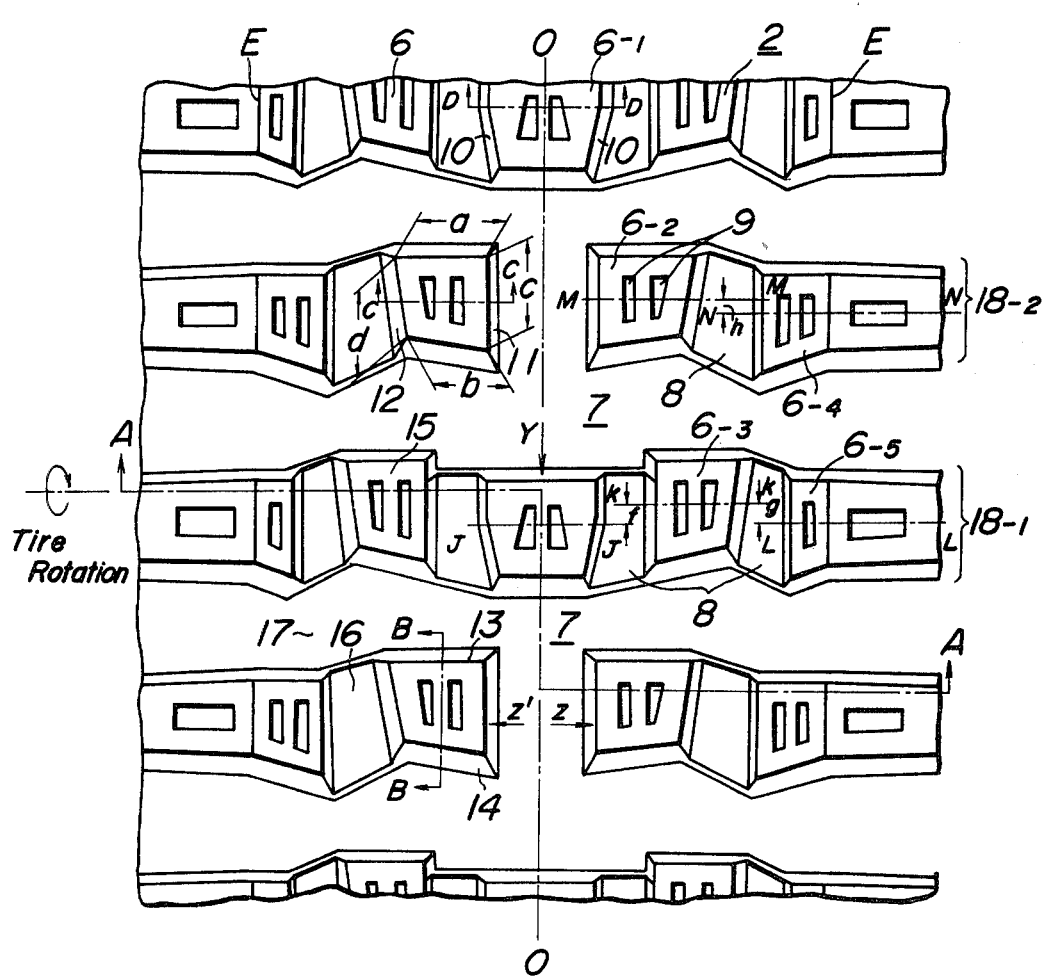
FIG. 1 is a development view of one embodiment of a tread pattern of a motocross tire according to the invention.
Figure 2:
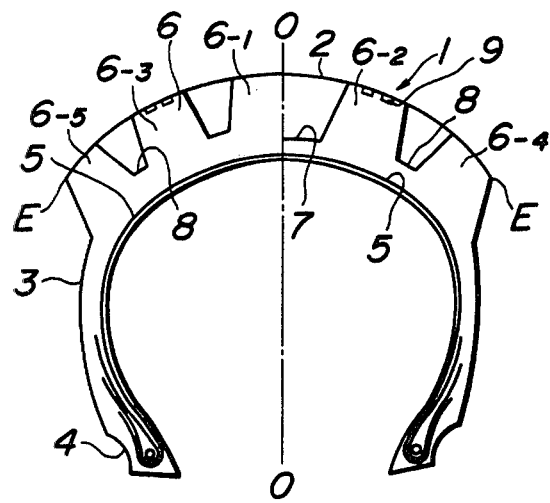
FIG. 2 is a section on line A—A of FIG. 1.

FIG. 1 shows one embodiment of a block pattern of a motocross tire according to the invention and FIG. 2 shows a section on line A—A of FIG. 1. In FIG. 2, reference numeral 1 designates a tire which comprises a toroidal carcass 5 extending from a tread 2 through both sidewall portions 3, 3 to both bead portions 4, 4. The carcass 5 is composed of a plurality of plies each having parallel rubberized fiber cords, the cords of one ply extending in an opposite direction with respect to the cords of the other ply. In FIG. 2, the carcass 5 is diagrammatically shown for the sake of clarity.

The tread 2 extends substantially in parallel with the contour of the carcass 5 and terminates at its ends E which are connected to both sidewall portions 3, 3, respectively.

The maximum width of the tire mounted on a rim and inflated under an internal pressure is defined by a distance between the tread ends E and E instead of a distance between the outer surfaces of the sidewall portions 3 and 3. This is due to considerations peculiar to the motorcycle and intended to maintain a necessary ground contact area even under such condition that the center of the ground contact region is displaced from the equatorial plane O—O of the tire when it runs straight ahead to that side of the tire which makes the camber angle when a driver tries to turn the motorcycle.

The tread 2 shown in FIG. 1 is composed of a number of blocks 6 which are different in shape. These blocks 6 are arranged in groups 6-1, 6-2, 6-3, 6-4 and 6-5 extending from the equatorial plane 0—0 of the tire toward both ends E, E of the tread 2.

If the tire is mounted on the driving wheel, the direction of the driving force subjected to the tire is determined. This direction is shown by an arrow Y in FIG. 1.

The direction of the camber thrust subjected to the tire when the tire turns is shown by an arrow Z if the camber angle is inclined toward the right side and the center of the ground contact region is displaced toward the right side. If the camber angle is inclined toward the left, the camber thrust is subjected to the tire in a direction shown by an arrow Z' in the same manner.

In those blocks 6-1, 6-2, 6-3 which are located near the tread center region and receive a large driving force, a width a of the block which receives the driving force is made wider than a width b of the block which is opposed to the above mentioned block and receives the braking force. As a result, in the section on line B—B of the block 6-2, that area of the side surface 13 having the width a which is projected on a plane perpendicular to the driving force direction shown by the arrow Y becomes larger than that area of the side surface 14 having the width b which is projected on the same plane. It is preferable that the width ratio a/b measured in a direction perpendicular to the driving force direction shown by the arrow Y is within a range between 1.1 and 1.5. In the present embodiment, concerning the blocks 6-4 and 6-5 near the tread ends E, E, the side surfaces corresponding to the side surface 13 and side surface 14 are made equal in width as measured in the direction perpendicular to the arrow Y. It is preferable to make these block widths different in width as in the case of the blocks 6-1 to 6-3.

Figure 3:
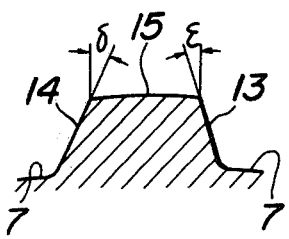
FIG. 3 is a section on line B—B of FIG. 1.

As shown in FIG. 3, an angle $\epsilon$ formed between a normal line perpendicular to the tangent to the outer surface 15 at the edge thereof and the side surface 13 is made preferably smaller than an angle $\delta$ formed between a normal line perpendicular to the tangent to the outer surface 15 at the edge thereof and the side surface 14. It is more preferable to make the difference between the angles $\epsilon$ and $\delta$ an angle within a range between 5° and 15°.

In the blocks other than the center block 6-1, a block length c of that side surface subjected to the camber thrust in the directions shown by the arrows Z, Z' is made longer than a block length d of the opposed side surface. In this case, it is preferable to make a length ratio c/d a value within a range between 1.1 and 1.3.

Figure 4:
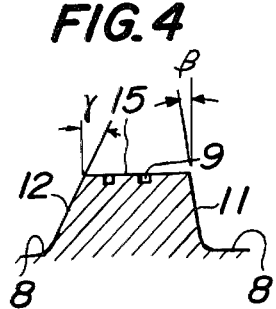
FIG. 4 is a section on line C—C of FIG. 1.

FIG. 4 shows a section on line C—C of the block 6-2. In the block 6-2, the length c is made longer than the length d so that that area of the block side surface 11 having the length c which is projected on a plane perpendicular to the camber thrust direction shown by the arrow Z or Z' becomes larger than that of the block side surface 12 having the length d. In addition, it is preferable to make angle $\beta$ of the side surface 11 formed between a normal line perpendicular to the tangent to the outer surface 15 at the edge thereof smaller than the similar angle $\gamma$ of the side surface 12. It is more preferable to make the difference between these angles $\beta$ and $\gamma$ a value within a range between 2° and 17°.

In FIGS. 3 and 4, the block side surfaces 13 and 11 may be inclined at the angles $\epsilon$ and $\beta$ from the block outer surface 15 to a position spaced apart from the block outer surface 15 by a distance corresponding to 20 to 40% of the depth from the outer surface 15 to the base 7, 8 and the remaining block side surfaces near the base 7, 8 may be inclined at angles corresponding to the larger angles $\delta$ and $\gamma$.

It is a matter of course that the above mentioned block widths a and b are measured in a direction perpendicular to the arrow Y, that is, the equatorial line of the tire. The block lengths c and d are measured in a direction perpendicular to the arrow Z or Z', that is, the rotary axis of the tire.

It is preferable to make the total sum of the lengths of the block outer surface 15 measured at any position between the tread ends E and E in the circumferential direction of the tread a value within a range between 20% and 30% of the circumferential length of the tread.

In the embodiment shown in FIGS. 1 to 5, a transverse platform 8 projected from the base 7 by a distance on the order of 2.5 mm may be used to connect the center block 6-1 through the block 6-3 to the block 6-5 or connect the block 6-2 to the block 6-4. In addition, each block may be provided on its outer surface 15 with a rectangular incision 9 having a depth of about 2 mm. The use of these measures may be adopted in dependence with the tire size, use or the like.

The side surfaces 13, 11 of the block are shown as flat planes extending in directions perpendicular to the centrifugal force and camber thrust directions, respectively. But, these side surfaces may be zigzag-shaped or inclined at an angle to the centrifugal force and camber thrust directions or of curved planes.

Figure 5:
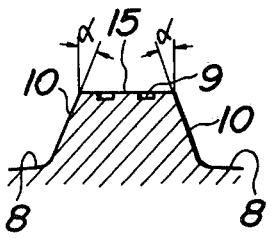
FIG. 5 is a section on line D—D of FIG. 1.

FIG. 5 shows a section of the center block 6-1 on line D—D of FIG. 1. In the present embodiment, the both block side surfaces 10, 10 are equally inclined at an angle $\alpha$ with respect to a normal line perpendicular to the tangent to the block outer surface 15 at the edge thereof. Alternatively, both the block side surfaces 10, 10 may be inclined at different angles from each other, for example, $\beta$ and $\gamma$ as shown in FIG. 4, with respect to the above mentioned normal line and these blocks may circumferentially be arranged such that the side surfaces inclined at the angles $\beta$ and $\gamma$ are altenately changed their positions.

If the block having the above mentioned configuration is formed of tread rubber having a 300% modulus of elasticity of 70 to 160 kg/cm$^2$, preferably 70 to 140 kg/cm$^2$ and a Shore A hardness of 55° to 75°, preferably 58° to 65°, which is smaller than that of the conventional tread rubber, it is possible to significantly improve the ground grasping property of the motocross tire.

In the embodiment shown in FIGS. 1 to 5, the blocks transversely extending along the tread 2 are divided into two different kinds of block groups 18-1, 18-2. Each block group is divided into individual blocks by means of a longitudinal grooves 16. The block groups are circumferentially divided into individual groups by means of a transverse groove 17. In each block group, the center of one of the blocks is circumferentially displaced from the center of adjacent block. In the block group 18-1, a line K—K extending in a direction perpendicular to the equatorial plane O—O and equally dividing the block length C of the block 6-3 is circumferentially displaced upwardly from a line J—J extending in a direction perpendicular to the equatorial plane O—O and equally dividing the block length of the center block 6-1 by a distance f. Similarly, a line L—L extending in a direction perpendicular to the equatorial plane O—O and equally dividing the block 6-5 is circumferentially displaced downwardly from the line K—K by a distance g. Alternatively, the line L—L may be circumferentially displaced upwardly from the line K—K by the distance g.

In the block group 18-2, a line N—N extending in a direction perpendicular to the equatorial plane O—O and equally dividing the block 6-4 is circumferentially displaced downwardly from a line M—M extending a direction perpendicular to the equatorial plane O—O and equally dividing the block 6-2 by a distance h.

Each of these distances f, g and h is within a range between 3 mm and 25 mm and selected as follows.

The blocks are circumferentially displaced one from the other such that if the camber angle is gradually increased, the surface subjected to the camber thrust is gradually widened. The distance of displacement may be made large at the block near the ends of the tread.

Figure 6:
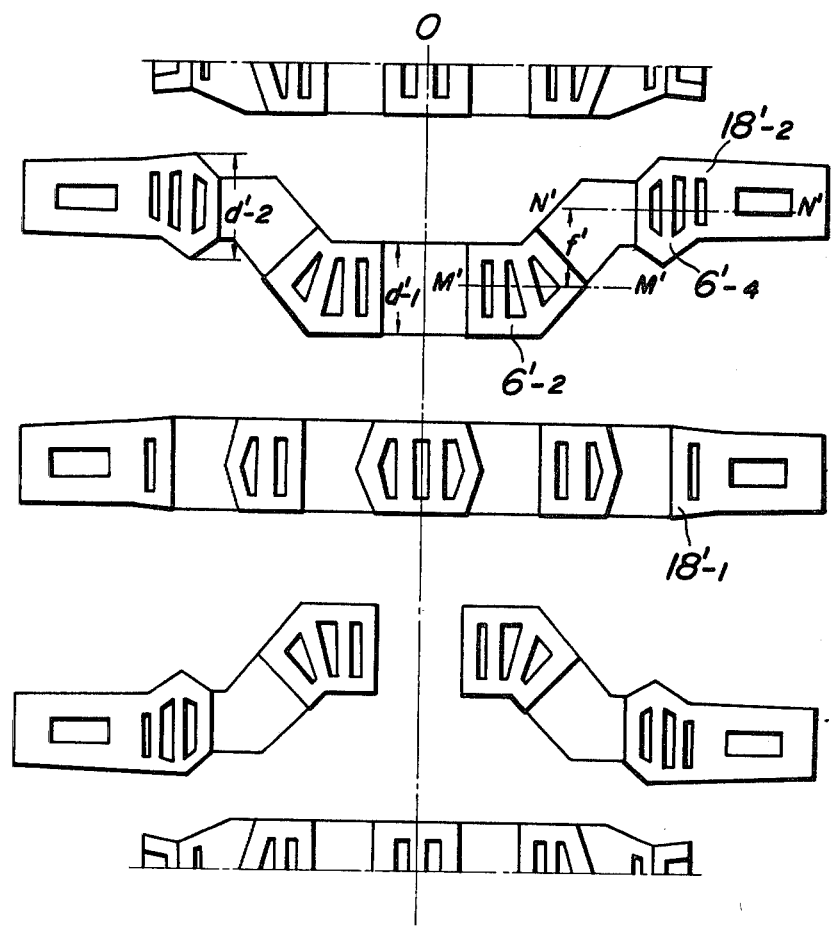
FIG. 6 is a development view of another embodiment of a tread pattern of a motocross tire according to the invention.

FIG. 6 shows another embodiment of a block pattern of a motocross tire according to the invention. In the present embodiment, the relation between that area of the driving force operative side surface which is projected on the plane perpendicular to the driving force direction or camber thrust direction and that area of the opposed side surface which is projected on the same plane is made the same as that shown in FIG. 1, but the block group 18'-2 having a block which is circumferentially displaced from adjacent block and the block group 18'-1 all of the blocks of which are aligned with each other are alternately arranged in the circumferential direction by taking the camber thrust into consideration.

In FIG. 6, a line N'—N' extending in a direction perpendicular to the equatorial line O—O and equally dividing the circumferential length d'-2 of the block 6'-4 is circumferentially displaced upwardly from a line M'—M' extending in a direction perpendicular to the equatorial plane O—O and equally dividing the circumferential length d'-1 of the block d'-2 by a distance f'.

FIGS. 7a to 7e show a change of the ground contact region when the motocross tire including the tread pattern shown in FIG. 1 is urged under pressure against a hard plate surface and the camber angle is gradually increased. In FIG. 7a, reference numeral 19 designates an outer contour formed by smooth curves for connecting outer edges of prints of the blocks 6 produced when the tire tread coated with a stamp ink is urged under pressure against a flat hard plate with a white relatively thick paper sandwiched therebetween and with the tire inclined with various camber angles.

As seen from FIGS. 7a to 7e, if the camber angle is increased from 10° through 20° and 30° to 40°, an ellipse-shaped ground contact region which is symmetrical with respect to its major axis when the camber angle is 0° as shown in FIG. 7e is changed into an elongate ellipse-shaped ground contact region which is unsymmetrical with respect to its major axis in dependence with the increase of the camber angle.

In the present invention, a ratio of the ground contact area of the blocks included in the outer contour 19 to a gross, that is a total ground contact area of the tire which means an area enclosed within the outer contour 19 is changed within ±0.05, that is within a range of at most 0.10. The use of such measure together with determination of the circumferential displacement arrangement and configuration of the block provides a motocross tire which can produce a smoothly increasing camber thrust. As a result, it is preferable to make the above mentioned area ratio within ±0.03, that is at most 0.06.

Running tests around a motocross course one round of which is 2.08 km (1.3 mile) were effectuated on a tire A including the tread pattern shown in FIG. 1, a tire B including the tread pattern shown in FIG. 6 and a conventional tire C. Each of the tires A, B and C to be tested had a tire size of 5.10-18, 4 plies and of bias laid construction. The main properties of the tires to be tested are listed in the following Table 1.

TABLE 1

| Kind of Tire | A | B | C |
|---|---|---|---|
| Circumferential of blocks (mm) | f : 4<br>g : 3<br>h : 3 | f' : 20 | None |
| Change in ratio of<br>Block ground contact area / grass ground contact area | 0.02 | 0.03 | 0.15 |

In the above Table 1, the conventional tire C to be tested comprises blocks corresponding to those of the block group 18'-1 only shown in FIG. 6 and circumferentially arranged along the periphery of the tire and spaced apart from each other. The change in the ratio of $$\frac{\text{block ground contact area}}{\text{grass ground contact area}}$$

is a value which is the difference between the maximum value and the minimum value when the camber angle is changed within a range between 0° and 40°.

The running tests have demonstrated the result shown in the following Table 2.

TABLE 2

| Kind of tire | A | B | C |
|---|---|---|---|
| Smoothness in turning | Good | Good | Bad |
| Lap time Average of 1 to 5 laps | 1'46"2 | 1'44"6 | 1'49"5 |
| Average of 5 to 10 laps | 1'46"2 | 1'45"1 | 1'51"8 |
| Block wear | Little | Little | Much |

As seen from the Table 2, the tires A, B according to the invention are capable of smoothly turning the motocross course with the motorcycle body inclined toward ground. On the contrary, the conventional tire C eventually considerably flips at a certain inclined angle of the motorcycle body. In addition, the conventional tire C always slips on ground, thereby causing a driver to lose his peace of mind. This is manifested by the result of the lap time. In addition, the tires A and B according to the invention showed a relatively little block wear after the running test. On the contrary, the conventional tire C formed of the same kind of rubber as that of the tires according to the invention showed much wear at those edges of the block which are subjected to the driving force and camber thrust. This edge wear has shown the result that the average of 5 to 10 laps is inferior to the average of 1 to 5 laps.

As stated hereinbefore, the motocross tire according to the invention is capable of exhibiting an excellent driving ability and turning ability necessary for the motncross tire provided that a given number of blocks or an amount of blocks for the tread as a whole is determined on the basis that the running ability is balanced with the resistance to wear and capable of favorably alleviating its wear and maintaining its effective ground grasping property irrespective of progress of the wear of the tire.

What is claimed is:

1. In a motocross tire for motorcycles having a pair of bead portions, a toroidal carcass extending across said bead portions, and a tread including a number of blocks having an outer surface extending from the crown portion of said carcass along the contour of said carcass to both sides of the tread and spaced apart from each other by transverse grooves and longitudinal grooves, the improvement comprising; said blocks are divided into a plurality of block groups extending in the widthwise direction of the tread and including a block group having adjacent blocks whose centers are circumferentially displaced by 3 to 25 mm and all of the blocks are arranged such that the total sum of lengths of the block outer surfaces measured at any portion between tread ends in the circumferential direction of the tread is a value within a range between 20% and 30% of the circumferential length of the tread, a ratio of a net ground contact area of the blocks to the gross ground contact area of the tire changes within a range of ±0.05 in response to a change in the chamber angle of the tire, and each of said blocks is formed of tread rubber having a 300% modulus of elasticity of 70 to 160 kg/cm$^2$ and a Shore A hardness of 55° to 75°.

2. The motocross tire according to claim 1, wherein the number of said block groups including circumferentially displaced blocks is at least one-half of all of said block groups.

3. The motocross tire according to claim 1, wherein all of said block groups include said circumferentially displaced blocks.

4. The motocross tire according to claim 1, wherein the main portion of all of the blocks includes first side surface subjected to the driving force when the tire runs on irregular ground, a second side surface opposed to said first side surface, a third side surface subjected to the chamber thrust of the tire and a fourth side surface opposed to said third side surface, that area of said first side surface which is projected onto a plane perpendicular to the driving force direction being larger than that area of said second side surface which is projected onto a plane perpendicular to the driving force direction and that area of said third side surface which is projected onto a plane perpendicular to the camber thrust direction being larger than that area of said fourth side surface which is projected onto a plane perpendicular to the chamber thrust direction.

5. The motocross tire according to claim 4, wherein said first side surface of said block is substantially perpendicular to the driving force direction.

6. The motocross tire according to claim 5, wherein said third side surface of said block is substantially perpendicular to the camber thrust direction.

7. The motocross tire according to claim 4, wherein said first side surface is inclined at an angle with respect to a normal line perpendicular to the tangent to the block outer surface at the edge thereof and said second side surface is inclined at an angle which is larger than the inclined angle of said first side surface with respect to the tangent to the block outer surface at the edge thereof.

8. The motocross tire according to claim 4, wherein said third side surface is inclined at an angle with respect to a normal line perpendicular to the tangent to the block outer surface at the edge thereof and said fourth side surface is inclined at an angle which is larger than said angle with respect to a normal line perpendicular to the tangent to the block outer surface at the edge thereof, said third and fourth side surfaces being diverged toward the block base.

9. The motocross tire according to claim 1, wherein each of said blocks is formed of tread rubber having a 300% modulus of elasticity of 90 to 140 kg/cm$^2$ and a Shore A hardness of 58° to 65°.

* * * * *